INVENTOR
EHUD ALMOG

United States Patent Office 3,783,082
Patented Jan. 1, 1974

3,783,082
PANELS AND METHOD OF MAKING SAME
Ehud Almog, 13 Yegia Kapaim St.,
Ramat Hasharon, Israel
Filed Mar. 31, 1971, Ser. No. 129,682
Int. Cl. B32b 3/12, 5/18, 7/00
U.S. Cl. 161—37                     5 Claims

ABSTRACT OF THE DISCLOSURE

A panel comprises a pair of facing layers of sheet material forming the opposite outer faces of the panel, spaced blocks of insulating material between the facing layers, and ribs of rigid polyurethane foam in the spaces between the blocks of insulating material and bonding the facing layers together. The panel is produced by placing the insulating blocks on one facing layer with the blocks spaced from each other, placing the second facing layer thereover, and then injecting the rigid plastic foam into the spaces between the blocks (the blocks serving as molds) to form the ribs bonding the facing layers together.

BACKGROUND OF THE INVENTION

The present invention relates to panels, particularly to panels including rigid plastic foam, and to methods of making such panels. Rigid polyurethane foam is particularly suitable, but other rigid foams may be used, such as rigid polyester foam.

Rigid polyurethane foam possesses a number of desirable properties, particularly mechanical strength and good adhesion to most materials, which properties enable it to be advantageously used in panel constructions. Panels are known in which this material completely fills the space between the face layers, while bonding these layers together, but this material is relatively expensive, and therefore the cost of such panels is very high and uneconomical for many applications.

SUMMARY OF THE INVENTION

An object of the present invention is to provide panel constructions which exploit to best advantage the above-mentioned desirable properties of rigid plastic (e.g. polyurethane) foam, while using a minimum quantity of this material, thus enabling such panels to be constructed at low cost. A further object of the invention is to provide a method of making such panels.

According to the present invention, there is provided a panel comprising a pair of facing layers of sheet material forming the opposite outer faces of the panel, spaced blocks of insulating material between the facing layers, and ribs of rigid polyurethane foam in the spaces between the blocks of insulating material and bonding the facing layers together.

The blocks of insulating material need not have good mechanical strength, as the rigid polyurethane foam contributes the mechanical strength to the panel. The blocks may therefore be of a low-cost polystyrene foam, glass wool, or other suitable insulating or filler material. The facing layers may be of metal, plywood, plastic, asbestos, or of other suitable sheet material.

The panel may also include a plurality of spaced strengthening strips, preferably of metal, extending longitudinally (and also transversely) of the panel between the blocks of insulating material, the metal strips being bonded to the facing layers by the rigid polyurethane foam.

The invention also provides a method of making the above-described panel, wherein a plurality of blocks of insulating material are placed on one facing layer of sheet material with the blocks spaced from each other, a second facing layer of sheet material is placed over the blocks of insulating material, and rigid plastic foam is introduced by injection into spaces between the blocks to form ribs bonding the facing layers together.

It will be seen that the insulating blocks form molds for producing the ribs of rigid plastic foam, which ribs bond the facing layers together and also provide strength to the panel. The spacing between the ribs is dependent upon the thickness of the facing layers, thinner facing layers requiring shorter spacings between the ribs to prevent buckling. The thickness of the ribs depends upon the shearing force to be applied to the panel, and where this shearing force is particularly large, the mentioned strengthening strips may be provided.

Further features and advantages of the invention will be apparent from the description below.

BRIEF DESCRIPTION OF THE DRAWINGS

The invention is herein described, by way of example only, with reference to several preferred embodiments thereof shown in the accompanying drawings, wherein.

DESCRIPTION OF THE PREFERRED EMBODIMENTS

Figure 1:
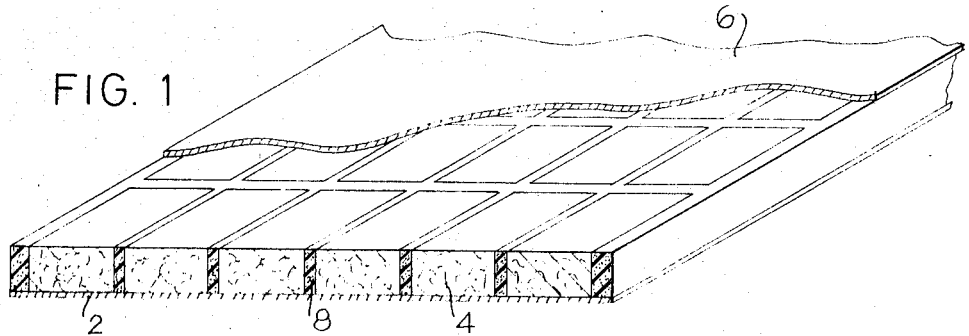
FIG. 1 illustrates the construction of one form of panel made in accordance with the invention.

The panel illustrated in FIG. 1 is made by placing on a layer of sheet material 2, a plurality of rectangular blocks 4 of insulating or filler material, which blocks are spaced from each other in both along their long and their short sides to form both longitudinally-extending and transversely-extending gaps between the blocks. A second layer 6 of sheet material is placed on top of blocks 4. Rigid polyurethane foam is then introduced by injection under pressure into the spaces between the blocks 4, while the two layers 2, 6, forming the opposite faces of the panel, are held in a press or by suitable clamps to prevent their separation. The rigid polyurethane foam fills all the gaps or spaces between the blocks 4 and thus forms rigid ribs 8 extending longitudinally and transversely of the panel. At the same time it bonds together the sheet material layers 2, 6.

It will be seen that the construction of FIG. 1 exploits to a maximum the desirable properties of rigid polyurethane foam, namely its mechanical strength and its good adhesion, while at the same time minimizing the quantity of this material used. Most of the space between the facing layers 2 and 6 is filled with low-cost insulating or filling material (blocks 4) which is substantially less expensive than rigid polyurethane foam. As a suitable filling material for blocks 4 there may be used polystyrene foam or glass wool. This low-cost material provides the insulation (and also serves as the mold for forming the foam ribs), whereas the more expensive rigid polyurethane foam provides the mechanical strength and also strongly bonds the facing layers together. Since a relatively small quantity of rigid polyurethane foam is used (being in the form of ribs) in the panel of FIG. 1, such panels may be produced much less expensively than panels completely filled with the polyurethane foam.

The facing layers 2, 6, may be made of any suitable sheet material, for example metal (e.g. aluminum or galvanized steel), fiber-glass reinforced polyester resin, other plastics, gypsum board, wood, plywood, asbestos, or other sheet material which can be bonded to the rigid plastic foam.

Figure 2:
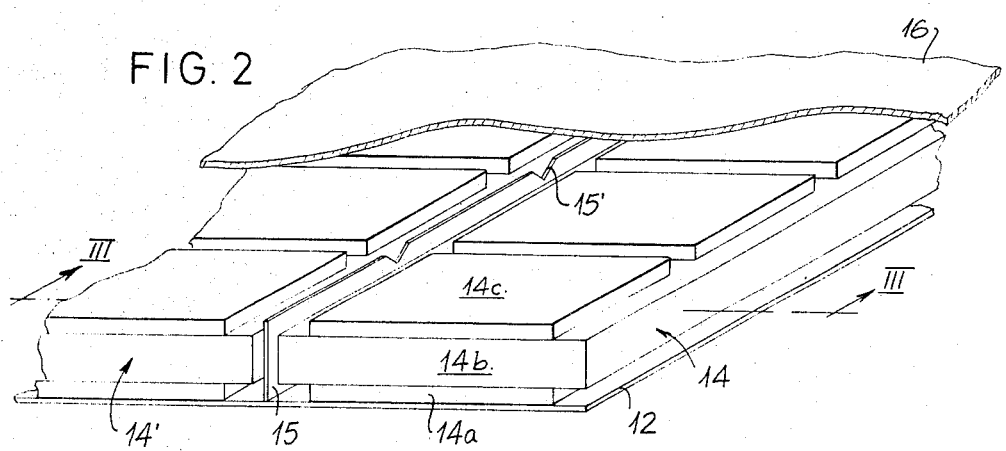
FIG. 2 illustrates the construction of a second panel made in accordance with the invention.
Figure 3:
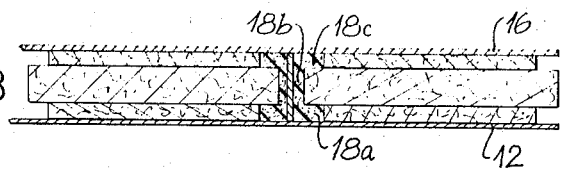
FIG. 3 is a transverse sectional view along lines III—III of FIG. 2.

FIGS. 2 and 3 illustrate another panel construction in accordance with the invention. In this construction the facing layers 12, 14 may be the same as the corresponding layers 2, 4 in FIG. 1. However, the blocks of insulating material (each block unit being designated 14 in FIG. 2) include smaller blocks 14a placed on top of facing layer 12 and spaced in both the longitudinal and transverse directions, larger blocks 14b placed on top of blocks 14a, and further smaller blocks 14c placed on top of the larger blocks 14b. The larger blocks 14b are of a length many times the width of the smaller blocks 14a, 14c, so as to bridge a plurality (four being shown in FIG. 2) of them. The width of the larger blocks 14b is slightly greater than the length of the smaller blocks 14a, 14c, so that the sides of blocks 14b project past the ends of blocks 14a, 14c.

Instead of having separate blocks 14a, 14b, 14c, they may be formed as integral block units, for example by molding single block units having the equivalent of one larger block 14b and four smaller blocks 14a, 14c on each of its opposite faces.

Block unit 14, whether made of separate blocks or of an integral block unit, is spaced from the other block units (e.g. 14') in both the longitudinal and tranverse directions of the panel. The panel further includes a plurality of spaced strengthening metal strips 15 extending longitudinally of the panel, there being one strip in the space between each block unit (14, 14'). The opposite faces of each metal strip are spaced from the confronting faces of the smaller blocks 14a, 14c, and are preferably spaced from the sides of the middle blocks 14b. Metal strip 15 is formed with notches 15' on its upper and lower edges, preferably in alignment with the spaces between adjacent blocks 14a and 14c.

After the blocks 14 and metal strips 15 are in place, the upper facing layer 14 is then placed on top of the blocks and the metal strips 15. The rigid polyurethane foam is then introduced by injection under pressure between the facing layers 12, 14, so that it fills all the spaces between these layers. The rigid polyurethane foam will thus form a layer of longitudinal and transverse ribs 18a adjacent to facing layer 12, another layer of longitudinally and transversely extending ribs 18c adjacent to facing layer 16, and a web 18b joining together the two layers of ribs. The notches 15' in metal strips 15 provide communication paths for the flow of the rigid polyurethane foam and are also filled with the foam.

Figure 4:
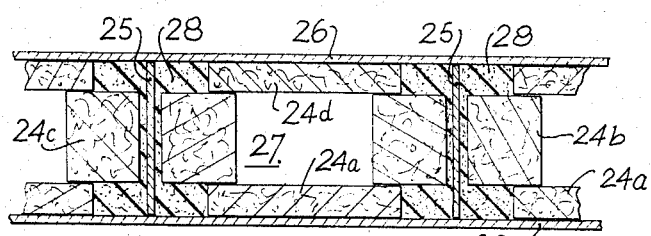
FIG. 4 is a transverse sectional view illustrating a third construction.

FIG. 4 illustrates another panel construction in accordance with the invention. In FIG. 4, long thin blocks 24a of the insulating material are placed on the lower facing layer 22, and then shorter, thicker blocks 24b, 24c of insulating material are placed on the ends of blocks 24a, and project past those ends. Further long thin blocks 24d are placed on top of blocks 24b, 24c, bridging the latter blocks. Blocks 24a, 24c, 24d thus form the walls of a hollow cavity 27. Metal strips 25, corresponding to metal strips 15 in FIGS. 2 and 3, are introduced either before or after the introduction of the filler material blocks, and the outer facing layer 26 is placed on top of the upper blocks 24c. Rigid polyurethane foam is then introduced by injection to fill all the spaces between the facing layers 22 and 26, except the hollow cavities 27 defined by the walls of the insulating blocks.

Figure 5:
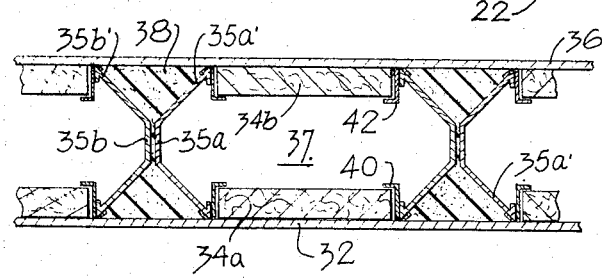
FIG. 5 is a transverse sectional view illustrating a fourth construction.

FIG. 5 illustrates a further panel construction, wherein the metal strips introduced between the insulating blocks are in the form of two juxtapositioned strips 35a, 35b. The ends 35a', 35b' of the strips diverge from each other to form spaces which are filled with the rigid polyurethane foam 38 during the injection step. In addition, the ends of the metal strips 35a, 35b are formed with or carry clips 40, 42 (which may be continuous ledges) for supporting the insulating blocks 34a, 34b.

In making the panel of FIG. 5, the insulating blocks 34a are first placed on top of the lower facing layer 32; the metal strips 35a, 35b are placed on top of facing layer 32 with their clips 40 engaging the top of blocks 34a; the upper blocks 34b are then inserted between clips 42 of the metal strips; the upper layer 36 is then applied; and the rigid polyurethane foam is then introduced by injection to fill the space between the diverging ends 35a', 35b' of the metal strips, and also to bond together the facing layers 32, 36. The polyurethane foam does not enter the hollow cavities 37, which remain void.

One or both of the face layers may be corrugated in any of the described embodiments.

The panels of the present invention are particularly useful for wall or partition panels of up to about 5 meters in length designed to withstand relatively light loads. My concurrently-file patent application No. 129,683, now U.S. Pat. No. 3,732,138 of May 8, 1973, discloses other related panel constructions particularly for use as floors or roofs involving greater loads or greater spans.

Many other variations, modifications and applications of the illustrated embodiments will be apparent.

What is claimed is:

1. A panel comprising a pair of facing layers of sheet material forming the opposite outer faces of the panel, a plurality of separate rectangular blocks of filler material disposed between the facing layers, said blocks being spaced from each other along their long sides and their short sides to form both longitudinally-extending and transversely-extending gaps between the blocks, and rigid polyurethane foam filling both said longitudinally-extending and transversely-extending gaps and bonded to said facing layers, whereby a relatively small quantity of the rigid polyurethane foam is effective to impart mechanical strength to the panels and also to bond the foregoing panel elements together.

2. A panel as defined in claim 1, wherein said blocks of filler material include a first layer of rectangular blocks each spaced from the others of the first layer both along their long sides and their short sides, a second layer of filler blocks disposed on top of the first layer and each of a dimension spanning a plurality of said first-layer blocks, each of the blocks of the second layer being spaced from the others of the second layer both along their long and their short sides, and a third layer of blocks substantially of the same dimension as the first layer of blocks and disposed on said second layer, each of the blocks of the third layer being spaced from the others of the third layer both along their long and their short sides, said rigid polyurethane foam filling all said spaces between said blocks.

3. A panel as defined in claim 1, wherein said blocks of filler material include a first layer of rectangular blocks spaced from the others of the first layer both along their long and short sides, a second layer of rectangular blocks disposed on the first layer, spaced from the others of the second layer both along their long and short sides, and a third layer of blocks each bridging a pair of the second layer of blocks to define a cavity, said rigid polyurethane foam filling all said spaces between the blocks except said cavities.

4. A panel as defined in claim 1, further including a plurality of spaced strengthening strips extending longitudinally of the panel between said blocks of filler material.

5. A panel as defined in claim 4, wherein said strengthening strips are disposed in juxtapositioned pairs with their ends diverging from each other to form spaces, said strips carrying clips at their opposite extremities supporting said filler blocks in two layers spaced from each other to form hollow cavities therebetween, said polyurethane foam filling the spaces formed between the diverging ends of the strengthening strips but not said hollow cavities.

References Cited
UNITED STATES PATENTS

| | | | |
|---|---|---|---|
| 3,345,241 | 10/1967 | Shannon | 161—36 |
| 3,412,513 | 11/1968 | Gösele | 52—612 |
| 3,472,728 | 10/1969 | Hitch | 161—69 |
| 3,642,550 | 2/1972 | Doll | 161—68 UX |

WILLIAM J. VAN BALEN, Primary Examiner

U.S. Cl. X.R.

161—161, 190